(12) United States Patent
Nakai

(10) Patent No.: US 11,919,434 B2
(45) Date of Patent: Mar. 5, 2024

(54) WHEELCHAIR FIXING DEVICE FOR VEHICLE

(71) Applicant: Toyota Jidosha Kabushiki Kaisha, Toyota (JP)

(72) Inventor: Fumiko Nakai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 694 days.

(21) Appl. No.: 17/097,128

(22) Filed: Nov. 13, 2020

(65) Prior Publication Data

US 2021/0188151 A1   Jun. 24, 2021

(30) Foreign Application Priority Data

Dec. 19, 2019   (JP) ................. 2019-229765

(51) Int. Cl.
*B60P 7/08*   (2006.01)
*A61G 3/08*   (2006.01)

(52) U.S. Cl.
CPC .......... *B60P 7/0823* (2013.01); *A61G 3/0808* (2013.01)

(58) Field of Classification Search
CPC ............................ B60P 7/0823; A61G 3/0808
See application file for complete search history.

(56) References Cited

U.S. PATENT DOCUMENTS

| 4,257,644 A | * | 3/1981 | Stephens | A61G 3/0808 |
| | | | | 410/12 |
| 6,287,060 B1 | * | 9/2001 | Girardin | B60R 22/34 |
| | | | | 410/11 |
| 8,308,406 B2 | * | 11/2012 | Parks | A61G 5/10 |
| | | | | 410/7 |
| 2014/0084562 A1 | * | 3/2014 | Anooshian | A61G 5/1091 |
| | | | | 296/65.04 |

FOREIGN PATENT DOCUMENTS

| CN | 201494749 U | | 6/2010 |
| JP | 2001-212179 A | | 8/2001 |
| JP | 2002-021838 A | | 1/2002 |
| JP | 2002021838 A | * | 1/2002 |
| JP | 2004-159720 A | | 6/2004 |
| JP | 2014-177198 A | | 9/2014 |
| JP | 2014177198 A | * | 9/2014 |
| JP | 2017-148445 A | | 8/2017 |
| JP | 2018-089525 A | | 6/2018 |
| JP | 2018089525 A | * | 6/2018 |
| WO | 2014198273 A1 | | 12/2014 |

\* cited by examiner

*Primary Examiner* — Tony H Winner
*Assistant Examiner* — Hosam Shabara
(74) *Attorney, Agent, or Firm* — Dinsmore & Shohl LLP

(57) ABSTRACT

Provided is a wheelchair fixing device for a vehicle including: a lashing belt that has, at one end, a part-to-be-engaged that is configured to be able to engage with an engaging part exposed through a floor surface of a vehicle cabin; a hook that is provided at the other end of the lashing belt and configured to be able to engage with a frame of a wheelchair; and a hook cover that is formed by an elastic body into a tubular shape and fitted on an engaging region of the hook that is a region engaging with the frame.

4 Claims, 9 Drawing Sheets

WHEELCHAIR FIXING DEVICE FOR VEHICLE

CROSS-REFERENCE TO RELATED APPLICATION

This application claims priority to Japanese Patent Application No. 2019-229765 filed on Dec. 19, 2019, incorporated herein by reference in its entirety.

BACKGROUND

1. Technical Field

The disclosure relates to a wheelchair fixing device for a vehicle.

2. Description of Related Art

There is a hitherto known wheelchair fixing device that has a pressure-bearing part (a seat cushion in a flipped-up state) for rear wheels of a wheelchair that is provided on a rear side of a wheelchair placing region in a floor of a vehicle cabin, and lashing belts that couple the wheelchair and a vehicle body (anchors) together (see, e.g., Japanese Patent Application Publication No. 2017-148445). This wheelchair fixing device fixes a wheelchair as the lashing belts apply a tensile force directed toward a rear lower side to the wheelchair while the pressure-bearing part comes into pressure-contact with rear-wheel upper parts that are parts of the rear wheels of the wheelchair above an axle of the wheelchair.

SUMMARY

Some lashing belts are designed to fix a wheelchair to a vehicle body by having a hook, provided at one end thereof, hung on (engaged with) a metal frame of the wheelchair. Typically formed by a painted metal rod, such a hook is firmly engaged with the frame of the wheelchair by fastening the lashing belt so as to reduce its length after the hook is engaged with the frame.

Therefore, if one tries to detach the hook from the frame to detach the lashing belt, for example, without loosening the lashing belt, the hook does not easily slide over the frame, making it difficult to detach the hook from the frame. Moreover, since the metal hook is directly and firmly in contact with the metal frame, shaking (vibration) that the vehicle experiences may be directly transmitted to the wheelchair. When there is no passenger in a wheelchair, the lashing belt is left at a predetermined place. If the hook moves due to shaking (vibration) that the vehicle experiences, the hook may hit other parts around it and thereby damage those other parts or cause noise.

An object of the disclosure is to obtain a wheelchair fixing device for a vehicle that can increase the ease of the action of detaching a lashing belt from a frame of a wheelchair.

To achieve this object, a wheelchair fixing device for a vehicle according to the first aspect of the disclosure includes: a lashing belt having, at one end, a part-to-be-engaged that is configured to be able to engage with an engaging part exposed through a floor surface of a vehicle cabin; a hook that is provided at the other end of the lashing belt and configured to be able to engage with a frame of a wheelchair; and a hook cover that is formed by an elastic body into a tubular shape and fitted on an engaging region of the hook that is a region engaging with the frame.

In the disclosure according to the first aspect, the tubular hook cover formed by an elastic body is fitted on the engaging region of the hook that is the region engaging with the frame of the wheelchair. Therefore, when one tries to detach the hook from the frame to detach the lashing belt, for example, without loosening the lashing belt, one can slide the hook cover over the frame while elastically deforming the hook cover. This can increase the ease of the action of detaching the lashing belt from the frame of the wheelchair.

The wheelchair fixing device for a vehicle according to the second aspect is the wheelchair fixing device for a vehicle according to the first aspect, wherein the hook cover is made of urethane.

In the disclosure according to the second aspect, the hook cover is made of urethane. Thus, the weight of the hook cover can be reduced compared with when the hook cover is not made of urethane.

The wheelchair fixing device for a vehicle according to the third aspect is the wheelchair fixing device for a vehicle according to the first or second aspect, wherein: the engaging region of the hook includes a first curved section that continues from a base section to which the other end of the lashing belt is attached, a linear section that continues from the first curved section, and a second curved section that continues from the linear section; and the hook cover has slits, extending along a circumferential direction, in an outer circumferential surface on a tensile deformation side and an outer circumferential surface on a compressive deformation side that respectively correspond to the first curved section and the second curved section.

In the disclosure according to the third aspect, the hook cover has the slits, extending along the circumferential direction, in the outer circumferential surface on the tensile deformation side and the outer circumferential surface on the compressive deformation side that respectively correspond to the first curved section and the second curved section. This allows the hook cover to deform elastically along the first curved section and the second curved section so as to come into close contact with the first curved section and the second curved section.

The wheelchair fixing device for a vehicle according to the forth aspect is the wheelchair fixing device for a vehicle according to the third aspect, wherein the slits formed in the outer circumferential surface on the tensile deformation side have a linear shape as seen in a sectional view taken along an axial direction of the hook cover in a state of not being fitted on the hook, while the slits formed in the outer circumferential surface on the compressive deformation side have an inverted V-shape as seen in a sectional view taken along the axial direction of the hook cover in a state of not being fitted on the hook.

In the disclosure according to the fourth aspect, the slits formed in the outer circumferential surface on the tensile deformation side have a linear shape, while the slits formed in the outer circumferential surface on the compressive deformation side have an inverted V-shape, as seen in a sectional view taken along the axial direction of the hook cover in a state of not being fitted on the hook. This allows the hook cover to deform elastically along the first curved section and the second curved section more effectively so as to come into closer contact with the first curved section and the second curved section.

The wheelchair fixing device for a vehicle according to the fifth aspect is the wheelchair fixing device for a vehicle according to any one of the first aspect to the fourth aspect, wherein parts of an inner circumferential surface of the hook cover at ends in an axial direction are bonded to an outer circumferential surface of the hook by an adhesive.

In the disclosure according to the fifth aspect, the parts of the inner circumferential surface of the hook cover at the ends in the axial direction are bonded to the outer circumferential surface of the hook by the adhesive. This can restrain the hook cover from shifting out of the engaging region of the hook that is the region engaging with the frame of the wheelchair.

As has been described above, the disclosure can increase the ease of the action of detaching the lashing belt from the frame of the wheelchair.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
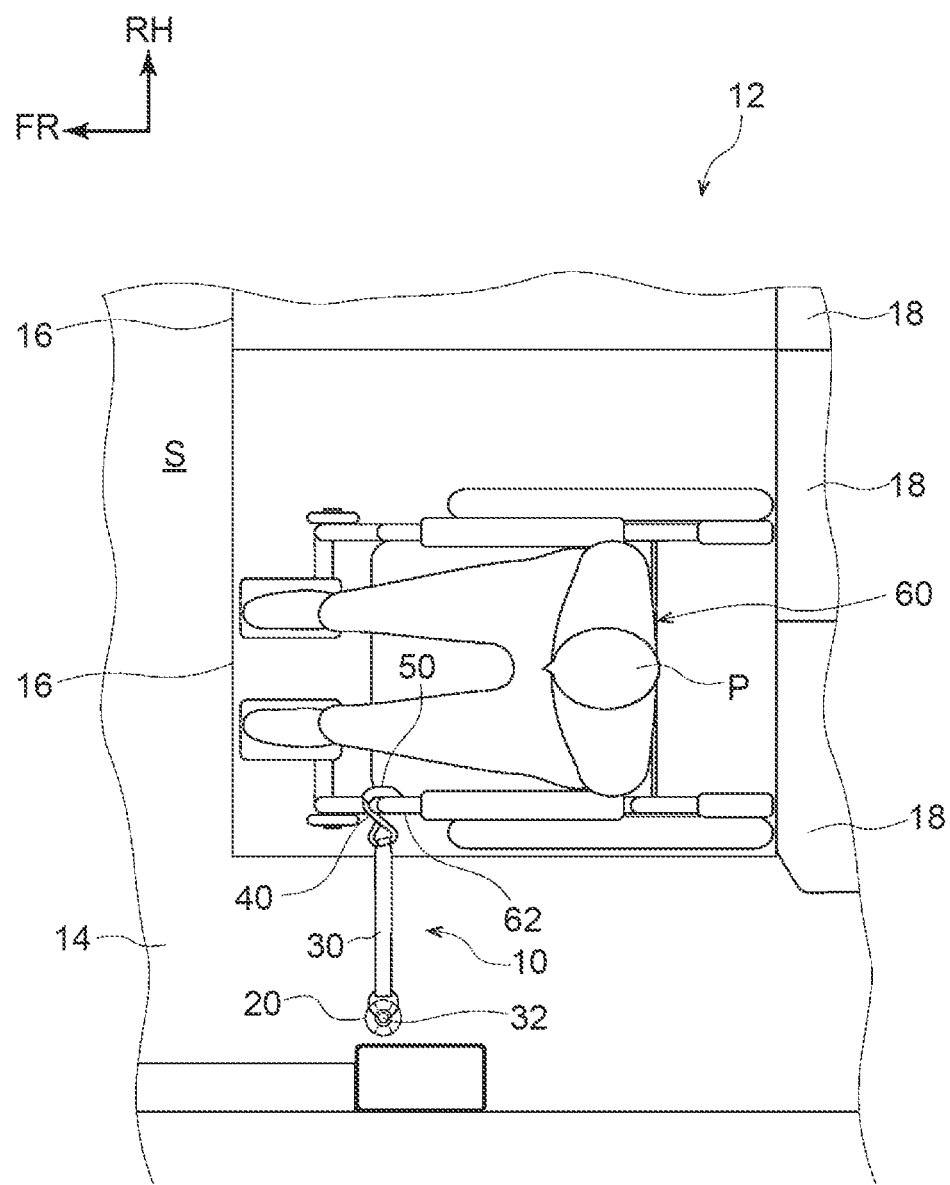
FIG. 1 is a plan view showing a state where a wheelchair fixing device for a vehicle according to an embodiment fixes a wheelchair.

An embodiment according to the disclosure will be described in detail below based on the drawings. A wheelchair fixing device 10 for a vehicle according to the embodiment is used for a passenger P in a wheelchair 60 who got on a bus 12 that is one example of passenger carrying vehicles (see FIG. 1). (The term "bus" here covers vehicles used for Mobility-as-a-Service (Maas) represented by self-driving buses.)

For the convenience of illustration, the arrows UP, FR, and RH shown as necessary in the drawings indicate a vehicle body upward direction, a vehicle body frontward direction, and a vehicle body rightward direction of the bus 12, respectively. Unless otherwise noted, the directions of up and down, front and rear, and left and right mentioned in the following description mean up and down in a vehicle body up-down direction, front and rear in a vehicle body front-rear direction, and left and right in a vehicle body left-right direction (vehicle width direction).

As shown in FIG. 1, a wheelchair space 16 is set in a floor surface 14 of a vehicle cabin S of the bus 12. The floor surface 14 of the vehicle cabin S here refers to an upper surface of a floor carpet laid on a floor panel as a floor, and in this upper surface of the floor carpet, rectangular frames having a long side thereof directed in the front-rear direction are indicated side by side in the left-right direction.

The wheelchair space 16 is marked with a wheelchair sign (not shown) at a substantially central part such that passengers can see at a glance that that spot is a boarding position for a passenger P in the wheelchair 60. On the rear side of the wheelchair space 16, a plurality of seats 18 in which other passengers (not shown) than the passenger Pin the wheelchair 60 can sit in a semi-standing posture is integrally provided in a row in the vehicle width direction.

An anchor 20 serving as an engaging part that detachably engages a part-to-be-engaged 32 provided at one end of a lashing belt 30 to be described later is exposed through the floor surface 14 of the vehicle cabin S. The floor carpet has a hole (not shown) through which the anchor 20 is exposed.

The lashing belt 30 is attached to the wheelchair 60 that got on board in the wheelchair space 16. The part-to-be-engaged 32 made of metal and configured to be able to engage with the metal anchor 20 is provided at the one end of the lashing belt 30, while a hook 40 made of metal and configured to be able to engage with a cylindrical metal frame 62 of the wheelchair 60 is provided at the other end of the lashing belt 30.

Figure 10A:
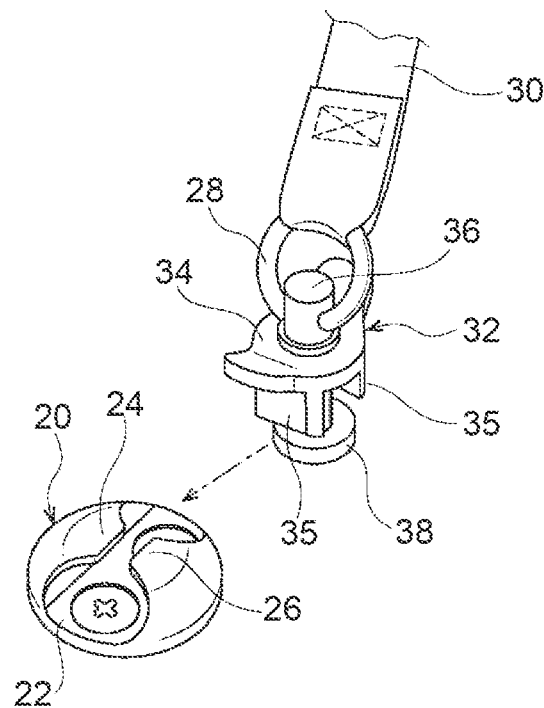
FIG. 10A is a perspective view showing a step of attaching, to an anchor, a part-to-be-engaged provided at one end of a lashing belt of the wheelchair fixing device for a vehicle according to the embodiment.

As shown in FIG. 10A, the anchor 20 has: a disc-shaped main body 22; a front-side projection 24 that extends from a front-side circumferential edge of the main body 22 such that a central portion of the front-side projection 24 in the vehicle width direction projects farther toward an upper rear side than both end portions thereof in the vehicle width direction; and a rear-side projection 26 that extends from a rear-side circumferential edge of the main body 22 such that a central portion of the rear-side projection 26 in the vehicle width direction projects farther toward an upper front side than both end portions thereof in the vehicle width direction.

The part-to-be-engaged 32 has a main body 34, a columnar rod 36 provided at a central portion of the main body 34 so as to be movable in the up-down direction, a disc-shaped pressing part 38 provided at a lower end of the rod 36, integrally and coaxially with the rod 36, and a coil spring (not shown) that is provided between the main body 34 and the rod 36 and urges the pressing part 38 upward.

A pair of left and right flat-plate-shaped engaging parts 35 is provided on a lower surface of the main body 34, integrally with and perpendicularly to the main body 34, with a thickness direction thereof directed in the vehicle width direction, and the pressing part 38 can be housed between the engaging parts 35. An interval between the pair of left and right engaging parts 35 is larger than the outside diameter of the pressing part 38. A ring 28 is provided at an upper portion of the rod 36, and one end of the lashing belt 30 is passed through and attached to the ring 28.

Figure 2:
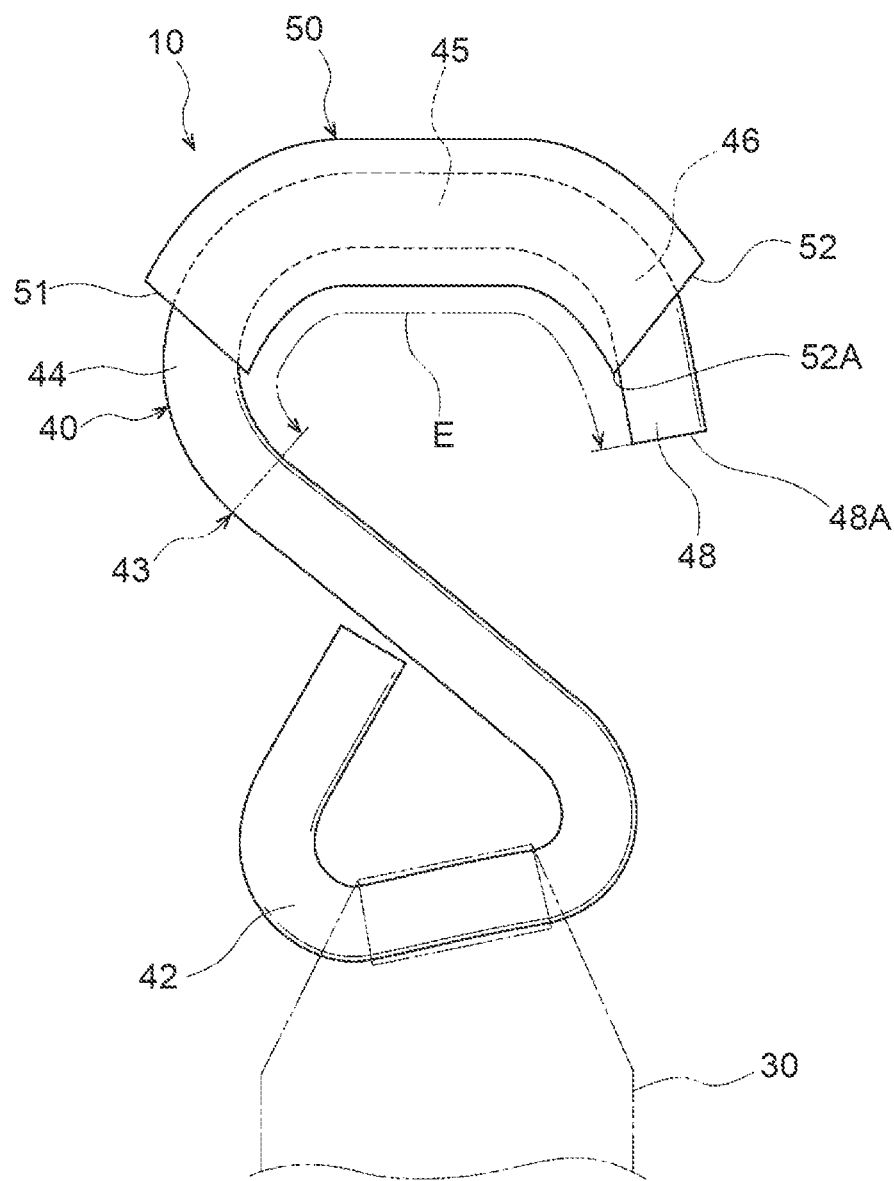
FIG. 2 is a front view showing a main part of the wheelchair fixing device for a vehicle according to the embodiment.
Figure 3:
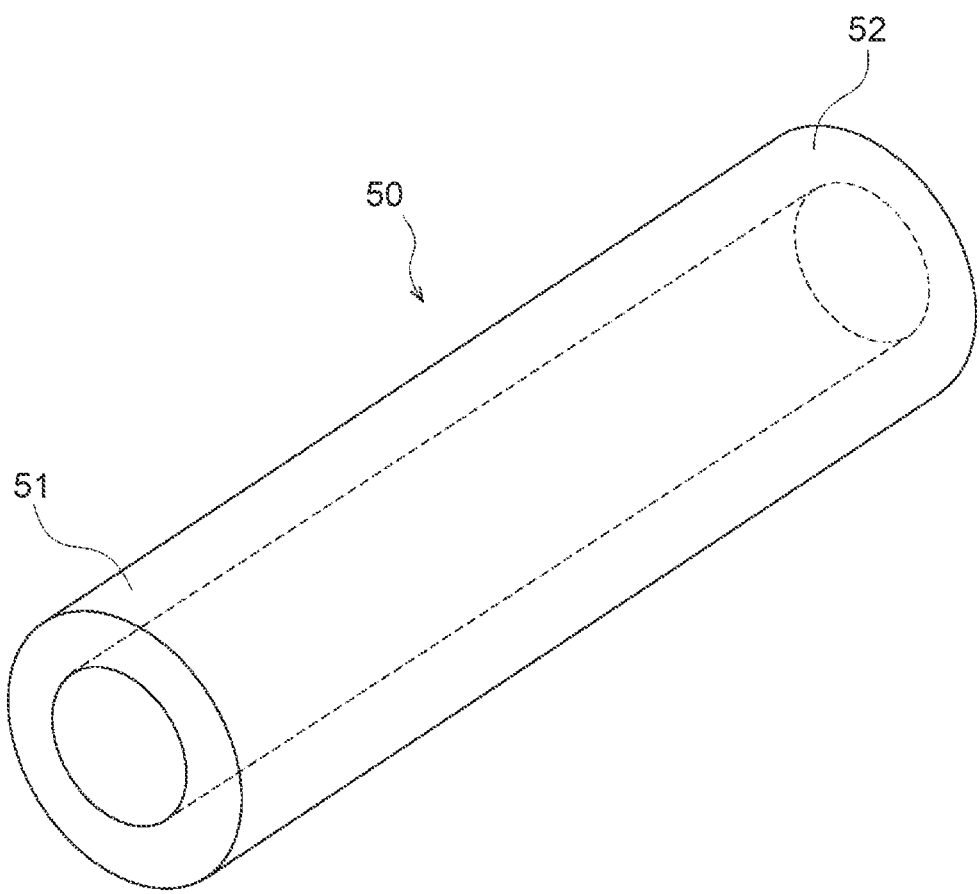
FIG. 3 is a perspective view showing a hook cover of the wheelchair fixing device for a vehicle according to the embodiment.

As shown in FIG. 2, the hook 40 provided at the other end of the lashing belt 30 is formed by bending a columnar rod into a substantially S-shape, and has: a substantially annular base section 42 which the other end of the lashing belt 30 is passed through and attached to; a first curved section 44 that continues from the base section 42; a linear section 45 that continues from the first curved section 44; a second curved section 46 that continues from the linear section 45; and a linear leading end section 48 that continues from the second curved section 46.

A hook cover 50 is attached to the hook 40. As shown in FIG. 3 to FIG. 6, the hook cover 50 is formed by an elastic body having an energy absorbing function, such as urethane (e.g., PE-Lite® manufactured by Inoac Corporation) into a cylindrical shape, and in some embodiments, the hook cover 50 is made of urethane.

The urethane hook cover 50 has hardness T within the range of, for example, 0.01 kN<T<0.5 kN. While it depends on the shape, outside diameter, etc. of the hook 40, the hook cover 50 has, for example, an axial length L (see FIG. 4) of 75 mm to 100 mm, an outside diameter Ro (see FIG. 6) of 20 mm to 25 mm, and an inside diameter Ri (see FIG. 6) of 8 mm to 10 mm.

As shown in FIG. 2, the hook cover 50 is fitted and fixed on the hook 40 so as to be entirely disposed inside an engaging region E of the hook 40 that is a region engaging with the frame 62. The engaging region E is a region stretching from a border (a point at which the curvature of the first curved section 44 starts) 43 between the base section 42 and the first curved section 44 toward the leading end section 48 (up to an end surface 48A of the leading end section 48), and the hook cover 50 is fitted at such a position as to cover at least a portion of the first curved section 44 on the side of the linear section 45, the linear section 45, and the second curved section 46.

Figure 8:
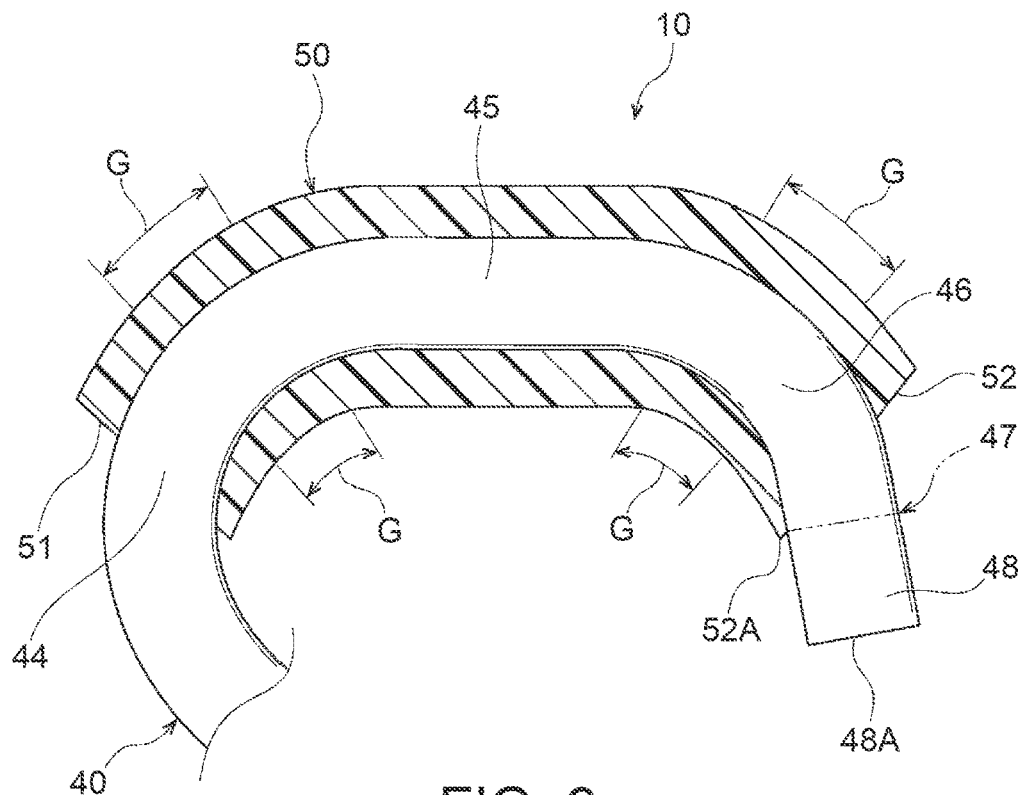
FIG. 8 is a sectional view showing, in close-up, the hook cover attached to a hook of the wheelchair fixing device for a vehicle according to the embodiment.

Hereinafter, one end of the hook cover 50 on the side of the base section 42 in the axial direction will be referred to as "one end 51," and the other end of the hook cover 50 on the side of the leading end section 48 in the axial direction will be referred to as "the other end 52." As shown in FIG. 8, an end surface 52A of the other end 52 of the hook cover 50 is located, on a compressive deformation side to be described later, at a border (a point at which the curvature of the second curved section 46 ends) 47 between the second curved section 46 and the leading end section 48.

Figure 4:
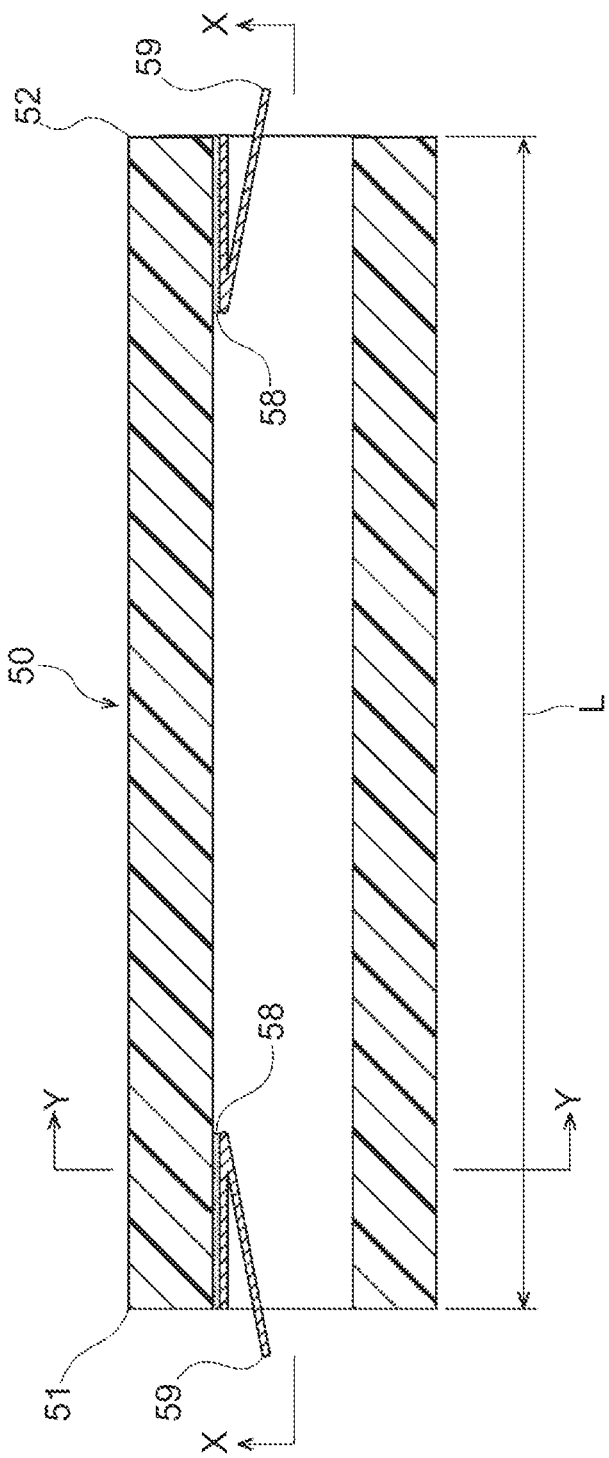
FIG. 4 is a front sectional view showing the hook cover of the wheelchair fixing device for a vehicle according to the embodiment.
Figure 5:
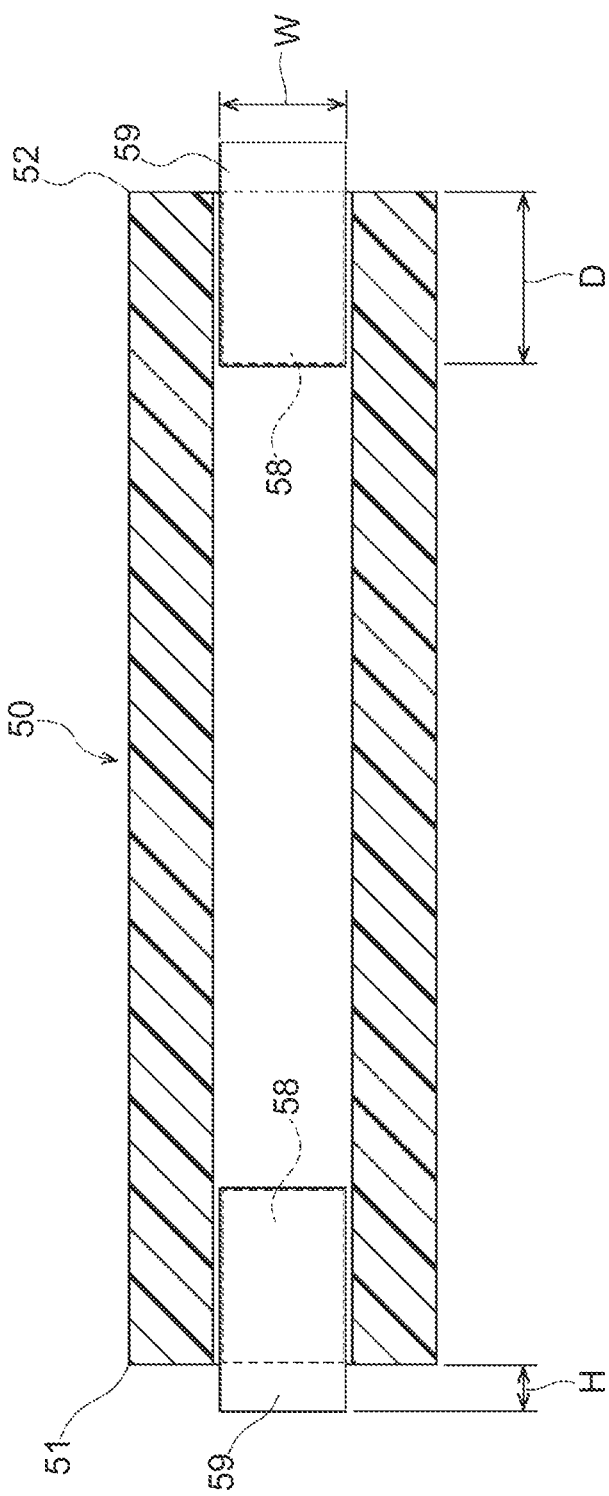
FIG. 5 is a sectional view taken along line X-X of FIG. 4, showing the hook cover of the wheelchair fixing device for a vehicle according to the embodiment.
Figure 6:
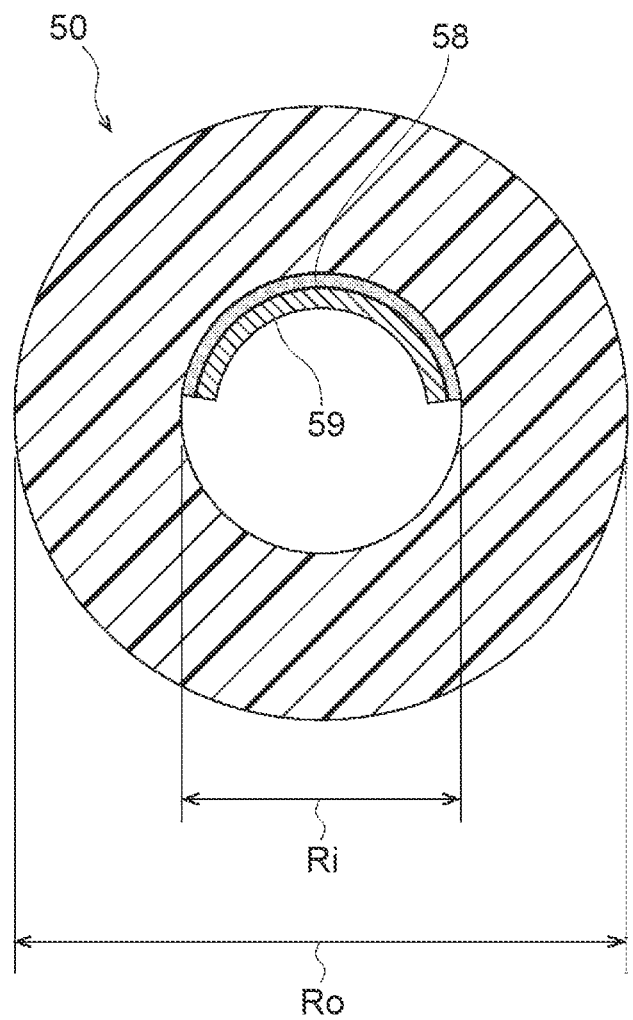
FIG. 6 is a sectional view taken along line Y-Y of FIG. 4, showing the hook cover of the wheelchair fixing device for a vehicle according to the embodiment.

As shown in FIG. 4 to FIG. 6, parts of an inner circumferential surface of the hook cover 50 at the one end 51 and the other end 52 are fixed by being bonded to parts of an outer circumferential surface of the hook 40 at the first curved section 44 and the second curved section 46, respectively, by double-sided tapes 58 as an adhesive.

FIG. 4 to FIG. 6 show a state where an adhesive surface on one side of each double-sided tape 58 is stuck to the corresponding part of the inner circumferential surface of the hook cover 50 at the one end 51 or the other end 52, while a release paper 59 remains on the other adhesive surface of each double-sided tape 58. To bond and fix the hook cover 50 to the hook 40 by the double-sided tapes 58, the hook cover 50 is fitted inside the engaging region E of the hook 40 and then the release papers 59 are peeled off to bond the two together.

As shown in FIG. 5, the release papers 59 protrude from end surfaces of the one end 51 and the other end 52 of the hook cover 50 toward outer sides in the axial direction by a predetermined length H (e.g., H=10 mm) such that one can pinch the release papers 59 with his or her fingers. In the sectional plan view shown in FIG. 5, the adhesive surface of each double-sided tape 58 has a width W of, for example, 5 mm to 10 mm, and a length D along the axial direction of, for example, 5 mm to 20 mm.

Figure 7:
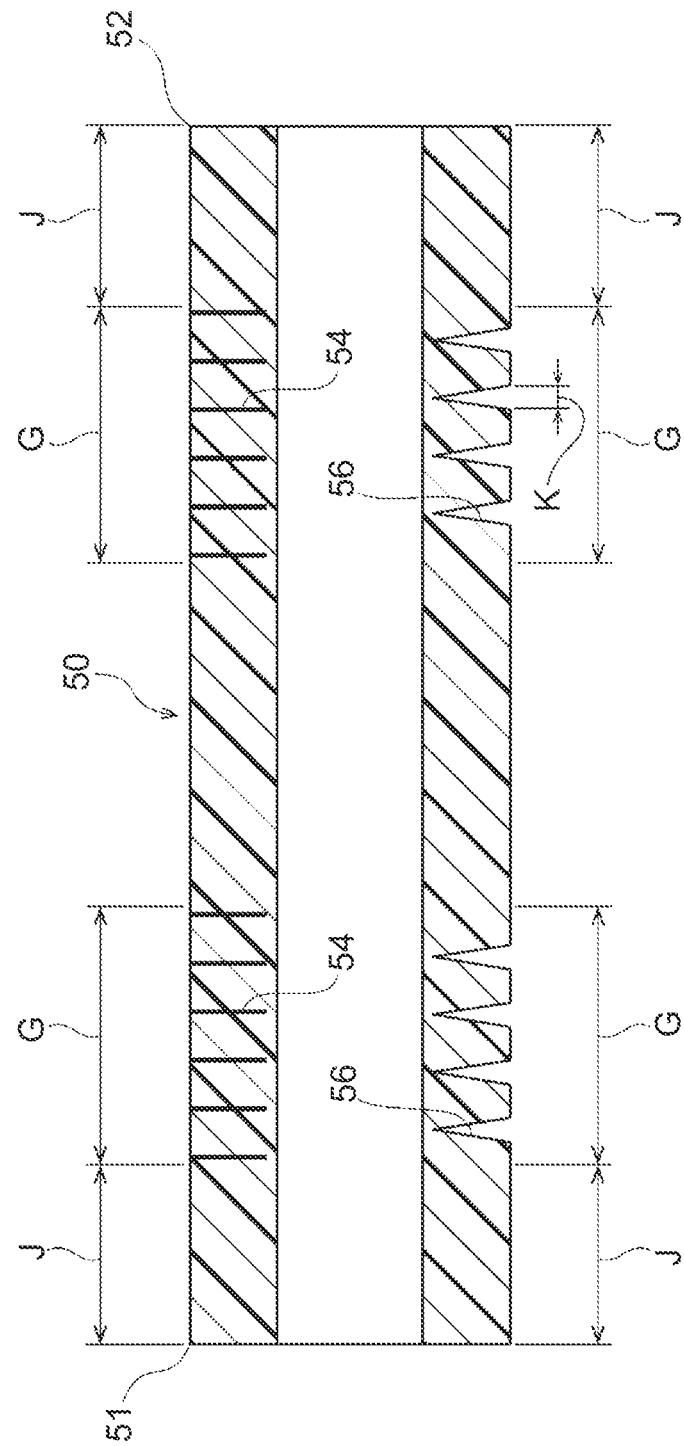
FIG. 7 is a front sectional view corresponding to FIG. 4, showing slits that are formed in the hook cover of the wheelchair fixing device for a vehicle according to the embodiment.

As shown in FIG. 7, the hook cover 50 has pluralities of slits 54, 56, extending along a circumferential direction, in predetermined regions G on an inner side in the axial direction relative to the one end 51 and the other end 52. Specifically, the regions G include regions that are subjected to tensile deformation by the first curved section 44 and the second curved section 46 and regions that are subjected to compressive deformation by these sections. For example, six slits 54 are formed in each tensile deformation-side region of the outer circumferential surface, and for example, four slits 56 are formed in each compressive deformation-side region of the outer circumferential surface.

The slits 54 formed in the outer circumferential surface on a tensile deformation side are formed by making linear incisions in a direction perpendicular to the axial direction of the hook cover 50 as seen in a front sectional view taken along the axial direction thereof in a state of not being fitted on the hook 40. The slits 56 formed in the outer circumferential surface on a compressive deformation side are formed by making inverted V-shaped notches as seen in a front sectional view taken along the axial direction of the hook cover 50 in a state of not being fitted on the hook 40. For example, the slits 54 are formed at 7 mm to 10 mm intervals in the axial direction, while the slits 56 are formed at 10 mm to 12 mm intervals in the axial direction when a maximum notch width K in the outer circumferential surface is 2 mm to 3 mm.

Those parts of the hook cover 50 that are located on the outer side from the slits 54, 56 (regions G) in the axial direction have a length J of, for example, 8 mm to 12 mm. When sticking the double-sided tapes 58 to the parts of the inner circumferential surface of the hook cover 50 at the one end 51 and the other end 52 is taken into account, the slits 54, 56 do not reach the inner circumferential surface of the hook cover 50 but may reach the inner circumferential surface. The slits 54, 56 are omitted from the drawings other than FIG. 7.

It is assumed that the bus 12 in this embodiment runs in a special lane at a speed of 20 km per hour or less. Therefore, even if a load directed frontward is applied to the wheelchair 60, for example, in the event of sudden braking of the bus 12, one lashing belt 30 for each wheelchair 60 is sufficient to fix the wheelchair 60 to the bus 12.

Described next are the workings of the wheelchair fixing device 10 for a vehicle according to the embodiment configured as has been described above.

As shown in FIG. 2 and FIG. 8, first, the hook cover 50 is attached to the hook 40. The hook cover 50 is fitted inside the engaging region E of the hook 40. Specifically, the hook cover 50 is disposed so as to cover a portion of the first curved section 44 on the side of the linear section 45, the linear section 45, and the second curved section 46.

Then, the release papers 59 of the double-sided tapes 58 stuck to the parts of the inner circumferential surface of the hook cover 50 at the one end 51 and the other end 52 are peeled off, and those parts of the inner circumferential surface of the hook cover 50 at the one end 51 and the other end 52 are bonded to the parts of the outer circumferential surface at the first curved section 44 and the second curved section 46 to thereby fix the hook cover 50 to the hook 40.

Thus, the hook cover 50 can be effectively restrained or prevented from shifting out of the engaging region E of the hook 40. More specifically, the hook cover 50 can be effectively restrained or prevented from shifting to such a position that the one end 51 is located beyond the border 43 between the base section 42 and the first curved section 44, or to such a position that the other end 52 is located beyond the leading end section 48.

When the hook cover 50 is fixed to the hook 40, the regions G on the inner side of the hook cover 50 relative to the one end 51 and the other end 52 in the axial direction are curved along the first curved section 44 and the second curved section 46. Since the slits 54, 56 are formed in these regions G (see FIG. 7), the parts of the inner circumferential surface of the hook cover 50 at the one end 51 and the other end 52 can be brought into close contact with the parts of the outer circumferential surface at the first curved section 44 and the second curved section 46. (The inner circumferential surface can be kept from lifting off the outer circumferential surface.)

In particular, the slits 54 formed on the tensile deformation side have a linear shape as seen in a front sectional view taken along the axial direction of the hook cover 50 in a state of not being fitted on the hook 40, so that the tensile deformation-side regions G can effectively elastically deform such that the slits 54 widen along the first curved section 44 and the second curved section 46. Thus, the parts of the inner circumferential surface of the hook cover 50 at the one end 51 and the other end 52 on the tensile deformation side can be brought into closer contact with the parts of the outer circumferential surface at the first curved section 44 and the second curved section 46.

The slits 56 formed on the compressive deformation side have an inverted V-shape as seen in a front sectional view taken along the axial direction of the hook cover 50 in a state of not being fitted on the hook 40, so that the compressive deformation-side regions G can effectively elastically deform such that the slits 56 narrow along the first curved section 44 and the second curved section 46. Thus, the parts of the inner circumferential surface of the hook cover 50 at the one end 51 and the other end 52 on the compressive deformation side can be brought into closer contact with the parts of the outer circumferential surface at the first curved section 44 and the second curved section 46.

Figure 9:
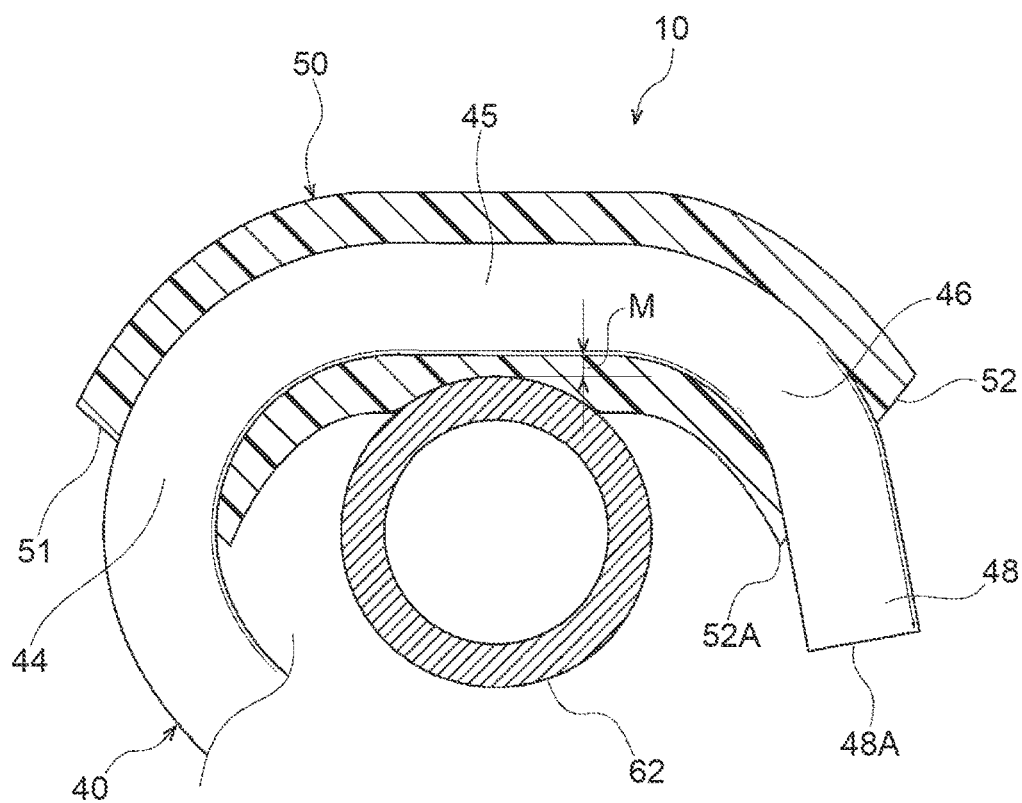
FIG. 9 is a sectional view showing, in close-up, a state where the hook cover of the wheelchair fixing device for a vehicle according to the embodiment is engaged with a frame of a wheelchair.

When the hook cover 50 is thus fixed inside the engaging region E of the hook 40, the hook 40 is hung on the frame 62 of the wheelchair 60 (see FIG. 1). Specifically, the hook cover 50 disposed in the engaging region E of the hook 40 is hung on (engaged with) the frame 62. Then, as shown in FIG. 9, a part of the hook cover 50 is elastically deformed and the frame 62 digs into the hook cover 50. Thus, the hook 40 can be stably kept in position relative to the frame 62 even in an emergency such as sudden braking of the bus 12.

Since the hook 40 is engaged with the frame 62 through the hook cover 50 that is made of urethane having an energy absorbing function, the hook 40 is not directly in contact with the frame 62. (The hook cover 50 with a remaining thickness M is interposed between the hook 40 and the frame 62.) Thus, shaking (vibration) that the bus 12 experiences can be hindered by the hook cover 50 from being directly transmitted to the wheelchair 60 through the lashing belt 30.

Since the hook 40 is not directly in contact with the frame 62, when one tries to detach the hook 40 from the frame 62 to detach the lashing belt 30, for example, without loosening the lashing belt 30, one can slide the hook cover 50 over the frame 62 while elastically deforming the hook cover 50. Specifically, the hook cover 50 can be slid while being elastically deformed with a force of, for example, 0.01 kN. Thus, the hook 40 can be easily detached from the frame 62. (The ease of the action of detaching the lashing belt 30 from the frame 62 can be increased.)

Since the hook cover 50 according to the embodiment extends only to such a position that the end surface 52A of the other end 52 thereof on the compressive deformation side reaches the border 47 between the second curved section 46 and the leading end section 48 that is the point at which the curvature of the second curved section 46 ends in the hook 40, the hook 40 can be more easily detached from the frame 62. (The ease of the action of detaching the lashing belt 30 from the frame 62 can be further increased.)

Specifically, if, for example, the hook cover 50 extends to such a position that the end surface 52A of the other end 52 on the compressive deformation side reaches the end surface 48A of the leading end section 48 of the hook 40, it is somewhat difficult to detach the leading end section 48 of the hook 40 from the frame 62 due to the increased area of contact (sliding resistance) between the frame 62 and the other end 52 of the hook cover 50 covering the leading end section 48 as a result of elastic deformation of the other end 52 of the hook cover 50.

By contrast, as described above, the hook cover 50 according to the embodiment extends only to such a position that the end surface 52A of the other end 52 on the compressive deformation side reaches the border 47 in the hook 40, and the leading end section 48 of the hook 40 is exposed without being covered by the hook cover 50. Thus, it is easy to detach the leading end section 48 of the hook 40 from the frame 62 because the area of contact between the leading end section 48 and the frame 62 is that of a minute point between arc surfaces that intersect and come into contact with each other and therefore small.

When there is no passenger P in the wheelchair 60 on board, the lashing belt 30 is left at a predetermined place. Therefore, the lashing belt 30 and the hook 40 may move due to shaking (vibration) that the bus 12 experiences. Here, the hook 40 is provided with the urethane hook cover 50 as described above.

Therefore, even if the hook 40 moves and the hook cover 50 hits other parts around it (e.g., the wheelchair 60, the floor surface 14, or a wall surface such as a side wall of the vehicle cabin S), the hook cover 50 is unlikely to damage those other parts or cause noise. Moreover, since the hook cover 50 is made of urethane, the weight of the hook cover 50 can be reduced compared with when the hook cover 50 is not made of urethane. In addition, when the hook cover 50 deteriorates, it can be replaced.

The part-to-be-engaged 32 of the lashing belt 30 is detachably engaged with the anchor 20 as follows: As shown in FIG. 10A, with the rod 36 pressed downward against the urging force of the coil spring, the pressing part 38 is inserted into a gap (insertion opening) between the main body 22 of the anchor 20 on one side and the front-side projection 24 and the rear-side projection 26 thereof on the other side, from an inner side or an outer side in the vehicle width direction. Then, the rod 36 is released from the downward pressure at a central portion of the anchor 20.

Figure 10B:
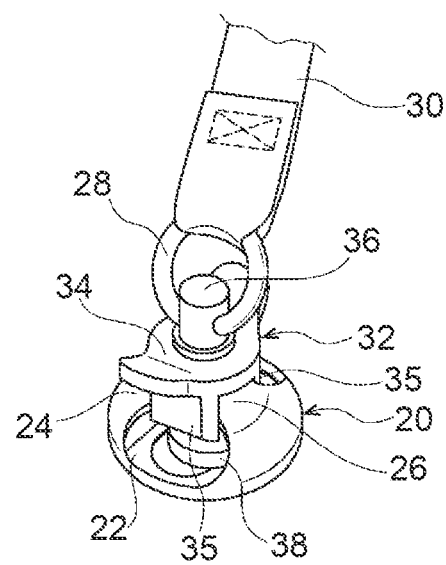
FIG. 10B is a perspective view showing a state where the part-to-be-engaged provided at the one end of the lashing belt of the wheelchair fixing device for a vehicle according to the embodiment is attached to the anchor.

Thus, as shown in FIG. 10B, the engaging parts 35 engage (enter) on left and right sides of the front-side projection 24 and the rear-side projection 26, and upper end portions of the front-side projection 24 and the rear-side projection 26 are held between an upper surface of the pressing part 38 and a lower surface of the main body 34 by the urging force of the coil spring. Thus, the part-to-be-engaged 32 of the lashing belt 30 can be engaged in a state where movement of the part-to-be-engaged 32 in the upward, downward, frontward, rearward, leftward, and rightward directions relative to the anchor 20 is limited.

To detach the part-to-be-engaged 32 of the lashing belt 30 from the anchor 20, the rod 36 is pressed downward against the urging force of the coil spring. In this state, the pressing part 38 is pulled out of the gap between the main body 22 of the anchor 20 on one side and the front-side projection 24 and the rear-side projection 26 thereof on the other side.

While the wheelchair fixing device 10 for a vehicle according to the embodiment has been described above based on the drawings, the wheelchair fixing device 10 for a vehicle according to the embodiment is not limited to that shown in the drawings and design changes can be made thereto as necessary within the scope of the gist of the disclosure. For example, the hook cover 50 is not limited to that made of urethane, and the adhesive is not limited to the double-sided tape 58.

The double-sided tape 58 as the adhesive may be provided at only one of the one end 51 and the other end 52 of the hook cover 50 instead of both the one end 51 and the other end 52. The dimensions of the parts of the hook cover 50 and the numbers of the slits 54, 56 mentioned above are merely examples and the dimensions and numbers are not limited thereto. Design changes can be made as necessary to the dimensions of the parts of the hook cover 50 and the numbers of the slits 54, 56 according to the shape, the outside diameter, etc. of the hook 40.

What is claimed is:

1. A wheelchair fixing device for a vehicle, comprising:
   a lashing belt having, at one end, a part-to-be-engaged that is configured to be able to engage with an engaging part exposed through a floor surface of a vehicle cabin;
   a hook that is provided at the other end of the lashing belt and configured to be able to engage with a frame of a wheelchair; and
   a hook cover that is formed by an elastic body into a tubular shape and fitted on an engaging region of the hook that is a region engaging with the frame, wherein:
   the engaging region of the hook includes a first curved section that continues from a base section to which the other end of the lashing belt is attached, a linear section that continues from the first curved section, and a second curved section that continues from the linear section; and
   the hook cover has slits, extending along a circumferential direction, in an outer circumferential surface on a tensile deformation side and an outer circumferential surface on a compressive deformation side that respectively correspond to the first curved section and the second curved section.

2. The wheelchair fixing device for a vehicle according to claim 1, wherein the hook cover is made of urethane.

3. The wheelchair fixing device for a vehicle according to claim 1, wherein the slits formed in the outer circumferential surface on the tensile deformation side have a linear shape as seen in a sectional view taken along an axial direction of the hook cover in a state of not being fitted on the hook, while the slits formed in the outer circumferential surface on the compressive deformation side have an inverted V-shape as seen in a sectional view taken along the axial direction of the hook cover in a state of not being fitted on the hook.

4. The wheelchair fixing device for a vehicle according to claim 1, wherein parts of an inner circumferential surface of the hook cover at ends in an axial direction are bonded to an outer circumferential surface of the hook by an adhesive.

* * * * *